Figure 1:
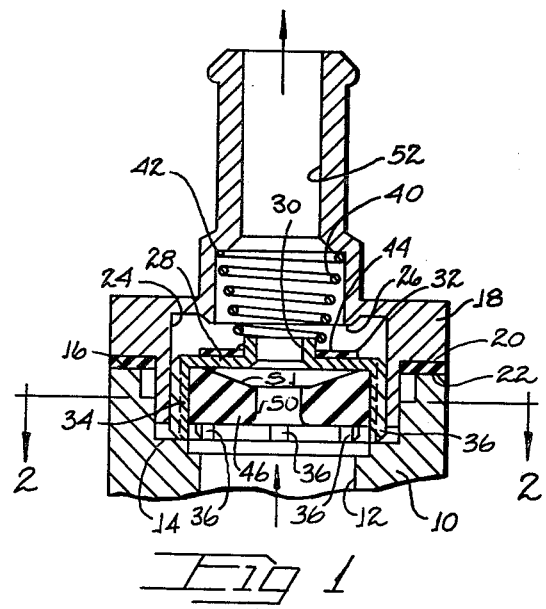

Aug. 21, 1962  P. G. HONSINGER  3,050,086
FLOW CONTROL HAVING LOW PRESSURE BY-PASS
Filed June 29, 1959

INVENTOR.
PHILIP G. HONSINGER
BY
WILSON, LEWIS & McRAE

3,050,086
FLOW CONTROL HAVING LOW PRESSURE BY-PASS

Philip George Honsinger, St. Clair Shores, Mich., assignor to American Radiator & Standard Sanitary Corporation, New York, N.Y., a corporation of Delaware
Filed June 29, 1959, Ser. No. 823,518
5 Claims. (Cl. 138—45)

This invention relates to a fluid control mechanism for delivering a fluid having substantially constant volumetric flow rate therethrough irrespective of substantial variations in pressure drop. The mechanism has application in various fields, but particularly in the domestic washing machine field wherein substantial variations in water pressure are encountered in different parts of the country and at different time periods.

In domestic automatic washing machines the filling of the washing machine tub is conventionally performed by a "time fill" operation, i.e., the supply valve is opened for predetermined time periods with the intended action being such that a predetermined amount of water will be discharged into the washing machine. However, any substantial variation in the inlet water pressure from the value for which the time fill mechanism is designed to operate will cause an improper filling of the machine. In order to eliminate this problem there have been devised various mechanisms for controllably throttling a fluid stream to obtain a substantially constant volumetric flow irrespective of fluid pressure drop variations. However, these devices have generally not been suited for controlling the volumetric flow over relatively wide pressure ranges. Thus, a device operable at pressure drops of 15 p.s.i. or more has not been effective at relatively low pressure drops such as in the neighborhood of 5 p.s.i. Conversely, devices designed to operate accurately at 5 p.s.i. pressure drop have not performed satisfactorily at the higher fluid pressure ranges.

A primary object of the present invention is to provide a device for maintaining a relatively constant volumetric delivery therethrough irrespective of wide variations in pressure drop thereacross.

Another object of the invention is to provide a flow control device operable at relatively low fluid pressure drops, as for example 5' p.s.i. and at high fluid pressure drops, as for example 20 p.s.i.

A further object of the invention is to provide a flow control device which is of a low cost, compact character so as to be competitive with prior art devices.

Another object of the invention is to provide a flow control device which can be readily installed in and removed from the outlet or inlets of a washing machine water mixing valve.

A further object of the invention is to provide a flow control device having two separate flow paths therethrough, each controlled by a separate flow control element responsive in a different pressure range, the assembly being such that volumetric control is maintained at the desired value during low pressure operation, high pressure operation, and intermediate pressure operation.

Other objects of this invention will appear in the following description and appended claims, reference being had to the accompanying drawings forming a part of this specification wherein like reference characters designate corresponding parts in the several views.

Figure 2:
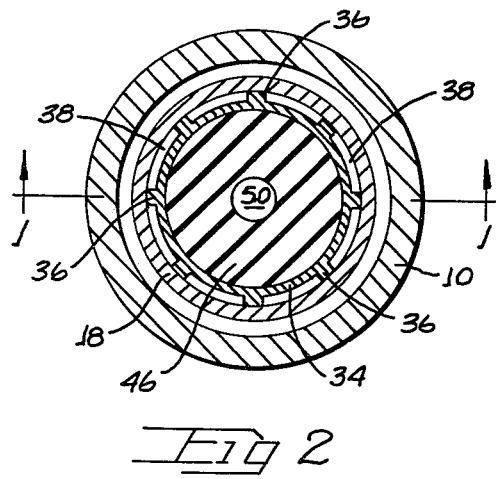

In the drawings:

FIGURE 1 is a sectional view through one embodiment of the invention taken on line 1—1 in FIG. 2; and FIG. 2 is a sectional view taken on line 2—2 in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, there is shown a fluid handling mechanism which may be formed as an outlet structure for a conventional washing machine water mixing valve. For purposes of the present invention the water mixing valve may be of various different constructions, and the mixing valve structure has not been illustrated in the present drawings. In the illustrated arrangement an annular wall or housing 10 of the water mixing valve forms an inlet passage 12 for the flow of fluid through the flow control mechanisms of the present invention. Inlet passage 12 is internally contoured to define an annular shoulder 14 and a second annular shoulder 16, the arrangement being such that the spigot structure 18 is insertable into housing 10 with the annular face 20 thereof engaged against a sealing gasket 22 carried on shoulder 16. Screws (not shown) may be utilized to fixedly but removably secure the spigot structure onto housing 10.

The spigot 18 is internally contoured to define a generally cylindrical cavity 24 and an annular valve seat 26. Floatably positioned within cylindrical cavity 24 is a cup-shaped carrier 28 having an opening 30 in its end wall 32. The cylindrical side wall 34 of the carrier is provided with the circumferentially spaced guide ribs 36, the spaces between said guide ribs constituting flow passages 38 arranged in generally annular relation with respect to the carrier axis. With no fluid flowing through the mechanism, carrier 28 is held in its illustrated position against the shoulder 14 by means of a light calibrated compression spring 40, said spring being positioned between the spigot structure shoulder 42 and the end wall 32 of the carrier 28. The carrier end wall 32 is preferably provided with a rubber facing sheet 44 for cooperation with the valve seat 26 to halt annular fluid flow during operation in the higher fluid pressure ranges as will be apparent hereinafter.

Positioned within carrier 28 is a rubber flow control annulus 46 arranged with its flow control opening 50 in alignment with the opening 30 in the carrier end wall 32. The downstream face 51 of the flow annulus 46 is concave as shown in FIG. 1 to permit the inner annular portion of the flow annulus to deform under relatively high fluid pressures in a manner to decrease the area of opening 50 for maintaining a substantially constant volumetric delivery through the mechanism. Although the drawings illustrate the flow annulus 46 as having a concave downstream face 51 it will be appreciated that other types of flow control constructions can be substituted therefor without departing from the spirit of the invention. If desired the flow annulus 46 may have flanges or flap portions at its periphery for insuring a tight seal on the carrier 28 at low pressure operation.

It will be seen that the illustrated construction provides two separate paths for the flow of fluid. Thus, at low fluid pressures some of the fluid from inlet 12 can pass through the annularly disposed passages 38 and thence past the valve seat 26 into the outlet passage 52 formed in the spigot structure 18. The remaining fluid can pass from inlet passage 12 through the central openings 50 and 30 into the outlet passage 52. At high fluid pressures rubber facing sheet 44 engages seat 26 to cut off flow through passages 38 and cause the entire flow to take place through central opening 50.

In operation, when the inlet fluid enters at a relatively low pressure, as for example 5 p.s.i., the major flow will take place through the annularly disposed passages 38, with a minor amount of the entering fluid flowing through the central opening 50. The fluid pressure on the upstream face of flow annulus 46 is transmitted to the carrier 28, with the flow annulus being rigid in the carrier without substantial reduction in size of opening 50. The relatively low fluid pressure is effective to compress the spring 40 so as to move the carrier 28 towards valve seat 26 for controllably throttling the fluid flow through the passages 38. In this connection the spring 40 is chosen to have a desired rate and load in accordance with the size of the annular valve seat 26 (annular flow path area) and the cross sectional area of the carrier 28, the arrangement being such as to give the desired change in flow throttling action of the carrier with each incremental change in fluid pressure.

If the entering fluid pressure should at any particular moment be at a relatively high value, as for example 15 p.s.i., the spring 40 will be compressed sufficiently to permit the facing sheet 44 to seal against the valve seat 26 so that the annular flow through the passages 38 is completely cut off. However, still higher fluid pressures are sufficient to deflect the flow annulus 46 sufficiently to decrease the cross sectional area of the flow opening 50 for maintaining the desired volumetric flow through the mechanism. At the relatively high fluid pressures (e.g., 15 p.s.i. and above) the flow control operation is performed entirely by the flow annulus 46, with the carrier 28 being substantially closed against valve seat 26.

The construction of the illustrated embodiment is such that it has accurate response to fluid pressure, both at high pressure drops and at low pressure drops. While the mechanism employs two separately operating flow control devices (i.e., the carrier 28 and the annulus 46), yet the control action is accurate during the intermediate pressure range as well as during the high pressure operation and low pressure operation. In this connection, the design of the unit is such that flow annulus 46 can preferably deflect a certain amount prior to complete closing of the carrier 28 against the valve surface 26. Thus, in the intermediate pressure range (e.g., 12 p.s.i. to 15 p.s.i.) the carrier 28 may be spaced a small incremental distance from the valve seat 26 for allowing a diminished flow of fluid through the passages 38, while the flow annulus 46 is in a partially deflected state for partially reducing the flow area of opening 50. Thus, in the intermediate pressure range the flow through the device is preferably controlled both by the carrier 28 and the flow annulus 46. As a result, when the pressure drop increases sufficiently to completely close the carrier 28 against seat 26 the flow annulus 46 has already begun to take control of the volumetric regulation, and there is no sudden fluctuation in volumetric delivery at this point.

From the above discussion it will be seen that with the illustrated construction there are in effect three stages of volumetric regulation, i.e., the low pressure drop stage wherein flow takes place primarily through the annular passages 38 under the throttling control of the carrier 28, the intermediate pressure drop stage wherein the inlet pressure fluid is throttled partially by the carrier 28 and partially by the flow annulus 46, and the high pressure drop stage wherein the flow is controllably throttled by the flow control annulus 46. In all three stages of control the volumetric delivery is maintained at substantially the same value.

As previously noted the mechanism is particularly suited for employment as a flow control device in domestic automatic washing machines for insuring a proper filling of the machine irrespective of substantial fluid pressure variations from a comparatively low inlet pressure range through a comparatively high inlet pressure range. In this manner the device is suited for use in all parts of the country, even in those areas having extremely low water pressures.

While the mechanism has increased utility over previous constructions, yet its cost is not appreciably increased over the cost of the less attractive flow control devices. Thus, the mechanism incorporates only two movable parts in addition to the spring 40, i.e., the carrier 28 and the flow annulus 46. The device is adapted for low cost manufacture as a compact construction particularly suited for employment in the outlet of a water mixing valve (as shown) or in the inlets of a water mixing valve.

It will be appreciated that various modifications of the illustrated construction can be employed without departing from the spirit of the invention as defined in the appended claims.

I claim:

1. In a constant volumetric fluid flow mechanism, a housing having a fluid flow passage therein, an annular valve seat in said passage, a cylindrical cup having a plate-like annular base, said cup being positioned within said fluid flow passage with said base engageable with said valve seat, flow passages formed between said cup and said housing passage to permit flow of fluid around said cup and through said valve seat, means biasing said cup away from said valve seat, and a separate deformable flow annulus carried within said cup.

2. In a constant volumetric fluid flow mechanism, a housing having a fluid flow passage therein, an annular valve seat in said passage, a cylindrical wall in said flow passage adjacent said valve seat, a cylindrical cup having an annular base, said cup being positioned in movable relation within said cylindrical wall and having ridges formed on the exterior thereof to guide said annular cup and engage said cylindrical wall and form flow passages along the exterior surface of said cup, said annular base of said cup being engageable with said valve seat to stop flow through said flow passages, means biasing said cup away from said seat, a deformable flow annulus carried within said cup for movement therewith, and said flow annulus having a depressed surface engageable with said cup base only when said flow annulus is deformed.

3. In a constant volumetric fluid flow mechanism, a housing having a fluid flow passage therein, said passage having an upstream end and a downstream end, an annular valve seat formed in said passage adjacent said downstream end, a cylindrical wall in said flow passage adjacent said valve seat and axially aligned therewith, a cylindrical cup positioned coaxially within said cylindrical wall and having an annular base, said cup being movable coaxially within said cylindrical wall to move said annular base into engagement with said valve seat, said cup having longitudinally extending ridges formed on the exterior thereof and providing flow passages between the exterior of said cup and said cylindrical wall, said cup base closing said flow passages when engaged with said valve seat, a spring biasing said valve away from said valve seat, a deformable flow annulus positioned within said cup for movement therewith, said flow annulus having a flow aperture communicating in fluid flow relation with said passage, and said flow annulus having a depressed annular surface positioned adjacent said cup base and engageable with said cup base only when said flow annulus is deformed.

4. In a constant volume fluid flow mechanism, a housing having a fluid flow passage therein, an annular valve seat in said passage, a first annular fluid flow control body positioned in said flow passage and movable against said valve seat, means providing fluid flow around the exterior of said first annular flow control body when said body is out of contact with said valve seat, means biasing said first annular fluid flow control body away from said valve seat, and a second annular fluid flow control body carried within said first annular fluid flow control body for movement therewith.

5. In a constant volume fluid flow control mechanism, a housing having a fluid passage therein, a valve seat in said passage, a flow control body positioned in said passage and movable against said valve seat, said flow control body having a fluid passage therethrough, a flow passage formed between said flow control body and said housing passage to permit flow around said flow control body and over said valve seat, means biasing said flow control body away from said valve seat, a deformable flow annulus carried within said flow passage of said flow control body, and said flow annulus having a depressed annular surface engageable with said flow control body only when said flow annulus is deformed.

References Cited in the file of this patent

UNITED STATES PATENTS

| | | |
|---|---|---|
| 2,353,161 | Heigis et al. | July 11, 1944 |
| 2,389,134 | Brown | Nov. 20, 1945 |
| 2,450,461 | Wallach | Oct. 5, 1948 |
| 2,716,997 | Crookston | Sept. 6, 1955 |
| 2,816,572 | Pratt | Dec. 17, 1957 |
| 2,829,674 | Segelhorst et al. | Apr. 8, 1958 |
| 2,878,836 | Binks | Mar. 24, 1959 |

FOREIGN PATENTS

| | | |
|---|---|---|
| 580,816 | Great Britain | Sept. 20, 1946 |